US010272462B2

United States Patent
Link et al.

(10) Patent No.: US 10,272,462 B2
(45) Date of Patent: Apr. 30, 2019

(54) METHOD AND APPARATUS FOR EXTRACTING PROCESS AIR LOADED WITH OVERSPRAY AND PLANT FOR COATING OBJECTS

(71) Applicant: Eisenmann SE, Böblingen (DE)

(72) Inventors: Kersten Link, Grafenau (DE); Werner Swoboda, Böblingen (DE); Jürgen Röckle, Magstadt (DE)

(73) Assignee: EISENMANN SE, Boeblingen (DE)

( * ) Notice: Subject to any disclaimer, the term of this patent is extended or adjusted under 35 U.S.C. 154(b) by 364 days.

(21) Appl. No.: 14/383,174

(22) PCT Filed: Feb. 16, 2013

(86) PCT No.: PCT/EP2013/000463
§ 371 (c)(1),
(2) Date: Sep. 5, 2014

(87) PCT Pub. No.: WO2013/131611
PCT Pub. Date: Sep. 12, 2013

(65) Prior Publication Data
US 2015/0135955 A1 May 21, 2015

(30) Foreign Application Priority Data
Mar. 7, 2012 (DE) ......................... 10 2012 004 704

(51) Int. Cl.
*B01D 45/00* (2006.01)
*B05B 14/40* (2018.01)
(Continued)

(52) U.S. Cl.
CPC .............. *B05B 14/40* (2018.02); *B01D 45/08* (2013.01); *B05B 14/43* (2018.02)

(58) Field of Classification Search
CPC .. B05B 15/1225; B05B 15/1248; B01D 45/08
See application file for complete search history.

(56) References Cited

U.S. PATENT DOCUMENTS 4,277,260 A * 7/1981 Browning .......... B01D 46/0068
118/326
4,345,921 A * 8/1982 Gustavsson ............ B01D 47/10
118/DIG. 7
(Continued)

FOREIGN PATENT DOCUMENTS

DE 19 17 958 A 10/1970
DE 26 17 355 11/1977
(Continued)

OTHER PUBLICATIONS

"Limit load." Defnitions.net. STANDS4 LLC, 2017. Web. Feb. 2, 2017.*

*Primary Examiner* — Amber R Orlando
*Assistant Examiner* — Phillip Y Shao
(74) *Attorney, Agent, or Firm* — Schroeder Intellectual Property Law Group, LLC

(57) ABSTRACT

A method for extracting process air loaded with overspray from a coating plant, which includes leading overspray picked up by an air stream as process air along a flow path to a conditioning device. The process air is led on the flow path through at least one replaceable flow module having an inlet opening and an outlet opening, on the inner surfaces of which overspray can be deposited and, after a limiting loading with overspray has been reached, can be replaced by an unloaded flow module. An apparatus for extracting process air loaded with overspray having at least one replaceable flow module having an inlet and an outlet opening arranged in the flow path of the process air. On the inner surfaces of the flow module, overspray can be deposited. The flow module can be replaced with an unloaded flow module after a limiting loading with overspray is reached.

17 Claims, 4 Drawing Sheets

(51) Int. Cl.
    *B01D 45/08*     (2006.01)
    *B05B 14/43*     (2018.01)

(56) References Cited

U.S. PATENT DOCUMENTS

| | | | |
|---|---|---|---|
| 4,471,715 A | | 9/1984 | Gubler et al. |
| 4,704,953 A | | 11/1987 | Wilson |
| 4,851,261 A | | 7/1989 | Gelain et al. |
| 5,593,470 A | * | 1/1997 | Shagott .............. A47L 5/38 |
| | | | 15/347 |
| 5,941,456 A | * | 8/1999 | Waryu .............. B05B 1/3006 |
| | | | 239/112 |
| 6,655,632 B1 | * | 12/2003 | Gupta .............. B64C 23/06 |
| | | | 244/1 N |
| 7,189,272 B2 | * | 3/2007 | Cheng .............. B05B 16/80 |
| | | | 55/385.2 |
| 2005/0229560 A1 | | 10/2005 | Eder |
| 2007/0062444 A1 | * | 3/2007 | Shutic .............. B05B 15/1214 |
| | | | 118/309 |
| 2013/0186049 A1 | * | 7/2013 | Holler .............. B01D 46/0095 |
| | | | 55/342 |

FOREIGN PATENT DOCUMENTS

| | | |
|---|---|---|
| DE | 37 12 437 A1 | 10/1988 |
| DE | 698 23 421 T2 | 3/2005 |
| DE | 10 2010 026 622 A1 | 1/2012 |
| EP | 0 071 756 A2 | 2/1983 |
| WO | 03/084638 A2 | 10/2003 |
| WO | 2013/013780 A1 | 1/2013 |

\* cited by examiner

METHOD AND APPARATUS FOR EXTRACTING PROCESS AIR LOADED WITH OVERSPRAY AND PLANT FOR COATING OBJECTS

RELATED APPLICATIONS

This application is a national phase of International Patent Application No. PCT/EP2013/000463, filed Feb. 16, 2013, which claims the filing benefit of German Patent Application No. 10 2012 004 704.5, filed Mar. 7, 2012, the contents of both of which are incorporated herein by reference.

FIELD OF THE INVENTION

The invention relates to a method and an apparatus for carrying off overspray-laden process air of a coating plant, in particular a painting plant, in which method and apparatus overspray is picked up by an air stream which is and, respectively, can be led as process air via a flow path to a processing device.

In addition, the invention relates to a plant for coating, in particular for painting, objects, in particular vehicle bodies, having a coating booth, in which coating material can be applied to the objects and through which can be led an air stream which picks up resulting overspray and carries it off as process air via a flow path.

BACKGROUND OF THE INVENTION

During the manual or automatic application of paints to objects, a partial flow of the paint, which generally contains both solids and/or binders as well as solvents, is not applied to the object. This partial flow is called "overspray" among experts. In general, this overspray is a disperse system, such as an emulsion or suspension or a combination thereof, and often has highly adhesive properties. The overspray is picked up by the air stream in the painting booth and mostly led to a processing device. There the overspray is separated from the process air, so that the air can be led back into the coating booth again, optionally after a suitable conditioning.

The overspray-laden process air is led via a flow path to the processing device by means of an air guiding device. For this purpose, in the plants known from the market, so-called air guiding plates and air guiding ducts composed of such plates, over and through which the overspray-laden process air flows, are used. However, on the surfaces over which the overspray-laden process air flows on the flow path to the processing device, already some of the overspray can be deposited before it reaches the processing device.

Over time, a thick layer of overspray thus forms on the air guiding device, which has highly adhesive properties and can disrupt the free flow path for the process air. Therefore, from time to time this overspray must be removed and the affected surfaces cleaned.

In order to make this cleaning easier, it is known to grease the relevant surfaces or cover them with a film. However, this is possible without difficulties only for easily accessible surfaces. This solution is not practicable where the flow path passes through ducts or the like possibly with a curved course.

SUMMARY OF THE INVENTION

It is therefore an object of the invention to provide a method, an apparatus and a plant of the kind mentioned at the outset which take account of these concerns.

This object may be achieved in a method of the kind mentioned at the outset in that overspray-laden process air is led on its flow path through at least one exchangeable throughflow module with an inlet opening and an outlet opening, on the inner surfaces of which module overspray can be deposited and which, after a limit loading with overspray has been reached, is exchanged for an unladen throughflow module.

According to the invention, at least part of the flow path of the overspray-laden process air is thus delimited by exchangeable throughflow modules. Such throughflow modules may be formed, for example, as disposable modules for a single use and as such can be disposed together with the overspray when the limit loading is reached. This is an advantageous solution even from an environmental point of view, since the cleaning of the affected surfaces which is customary in the prior art requires a great deal of energy and resources, such as water and cleaning agents. The throughflow modules therefore prevent overspray from coming into contact with stationary surfaces, e.g. of an air guiding device, at all.

It is favourable when a throughflow module is used as a disposable module and an exchanged and overspray-laden throughflow module is passed on to a disposal process. Alternatively, it may also be advantageous to pass on such a throughflow module to a recycling process.

Preferably, a throughflow module is arranged in a flow duct which is predetermined by an air guiding device. The method can thus be implemented also in already existing plants, in which an air guiding device is present in a manner known per se.

With regard to the apparatus, the object specified above may be achieved in that a) in the flow path of the overspray-laden process air, at least one exchangeable throughflow module with an inlet opening and an outlet opening can be arranged, on the inner surfaces of which module overspray can be deposited;

b) means are present, by which the at least one throughflow module, after a limit loading with overspray has been reached, is exchangeable for an unladen throughflow module.

The advantages correspond to the advantages explained above regarding the method.

It is advantageous when at least those regions of the throughflow module over which overspray-laden process air can flow are composed of a wet-strength and/or solvent-resistant material. An overspray-laden throughflow module can thus also be transported safely and without the danger that it could soften due to overspray and then tear.

If the throughflow module is produced from a flexible material, it can adapt well to predetermined geometries in the flow path of the process air.

In this regard, it is favourable when the throughflow module is produced from a textile material or from a plastic, in particular from polyethylene or polypropylene, or a woven fabric composite material.

Alternatively, it may be favourable when the throughflow module is produced from an inflexible material.

Preferably, the throughflow module is then produced from paper, paperboard and cardboard materials from plastics, in particular from polyethylene or polypropylene. In the present case, inflexible does not necessarily mean rigid; for example, cardboard can be bent, but is not as flexible as a textile material.

It is particularly advantageous when an air guiding device is present, which defines the flow path for the overspray-laden process air, and the throughflow module is formed, with respect to the cross-section or the geometry or the inlet opening or the outlet opening, complementary to that region of the air guiding device in which the throughflow module can be arranged. It is thus possible for plants which are already established also to be operated using one or more throughflow modules.

Preferably, an air guiding device is present, which comprises chamber segments in which in each case one throughflow module can be arranged. Through chamber segments the structure of the air guiding device can be scaled, so that possible equipment for removing and introducing throughflow modules can be efficiently employed.

With regard to the plant of the kind mentioned at the outset, the object specified above may now be achieved in that an apparatus for carrying off the process air is present with some or all of the features explained above.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the drawings, in which.

DETAILED DESCRIPTION OF THE PRESENT INVENTION

Figure 1:
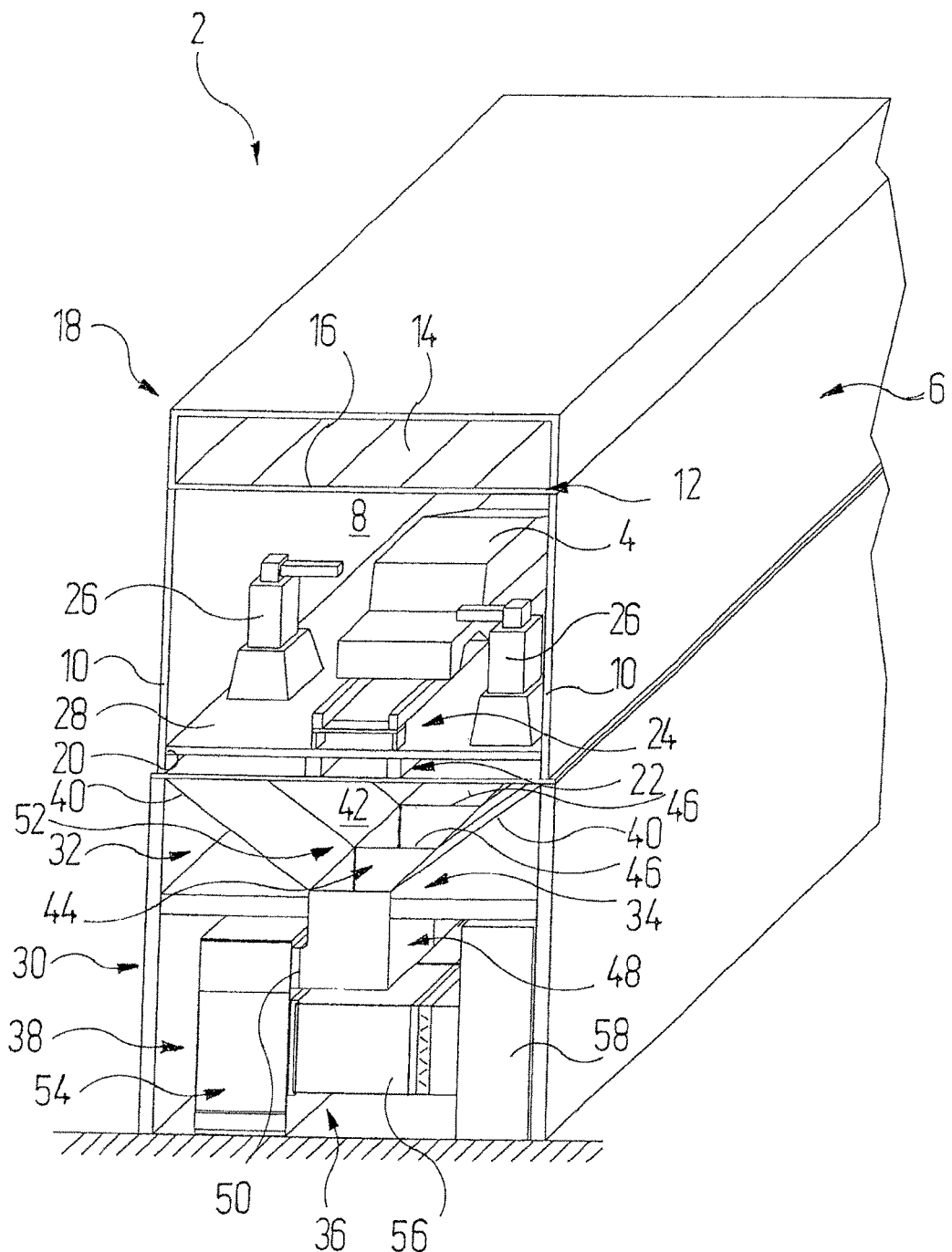
FIG. 1 shows a perspective view of a painting booth of a surface treatment plant, in which overspray-laden process air is led to a separating region by means of an air guiding device.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1, numeral 2 designates as a whole a surface treatment plant in the form of a painting plant, in which vehicle bodies 4 are painted after they have been, for example, cleaned and degreased in pretreatment stations (not shown specifically) upstream of the painting plant 2. The painting plant 2 comprises a painting booth 6 which rests on a steel structure in a manner known per se, which is not provided specifically with a reference symbol.

The painting booth 6 comprises a painting tunnel 8 which is arranged at the top and which is delimited by vertical side walls 10 and a horizontal booth ceiling 12, but is open at the ends. The booth ceiling 12 is the lower delimitation of an air supply space 14 and is formed as a filter ceiling 16. The air supply space 14 is part of an air system 18, by means of which an air stream can be generated, which flows through the painting tunnel 8 from the top downwards. Overspray resulting during the coating of the vehicle bodies 4 is picked up by this air stream, which is then carried off as process air after leaving the painting tunnel 8. In order to enable the overspray-laden process air to flow out of the painting tunnel 8 downwards, the latter is open downwards via a lower opening 20.

Arranged above this lower opening 20 of the painting tunnel 8 is a steel frame 22 which supports a conveying system 24 known per se, not discussed in more detail here. With this, vehicle bodies 4 to be painted can be transported from the entrance side of the painting tunnel 8 to its exit side. Situated in the inside of the painting tunnel 8 are application devices in the form of multi-axis application robots 26, as known per se. The vehicle bodies 4 can be coated with paint by means of the application robots 26.

The lower opening 20 of the painting tunnel 8 is covered by a plurality of walk-on gratings 28. Situated below the gratings 28 is a plant region 30 in which the overspray particles carried along by the process air are separated from the process air.

The plant region 30 comprises a flow region 32, into which the overspray-laden process air flows firstly from the painting tunnel 8 from above. Arranged in the flow region 32 is an air guiding device 34, by means of which the overspray-laden process air is carried off from the painting tunnel 8 and led to a processing device in the form of a separating device 36. The separating device 36 is arranged in a separating region 38 of the painting booth 6 which is situated below the flow region 32 in the present exemplary embodiment.

The flow region 32 is open upwards towards the painting tunnel 8. For this purpose, the air guiding device 34 comprises lateral air guiding plates 40 which are arranged such that an upwardly and downwardly open collecting duct 42 which tapers downwards is formed. This collecting duct 42 opens at the bottom into an air guiding duct 44 which extends horizontally in the longitudinal direction of the painting booth 6 and into which the process air laden with overspray particles flows, however, initially overall vertically downwards. The air guiding duct 44 is subdivided by partition walls 46, arranged transversely to the longitudinal direction of the painting booth 8, into upwardly open air guiding boxes 48 which are arranged one behind the other in the longitudinal direction of the painting booth 8.

The air guiding boxes 48 then divert the process air by 90° into the horizontal and comprise in each case an outlet flange 50 facing in the horizontal direction. The air guiding device 34 having the air guiding plates 40 and the air guiding boxes 48 in this way delimits a flow duct and thus predetermines a flow path 52 which leads to the separating device 36.

Each outlet flange 50 of an air guiding box 48 leads to a respective filter module 54, into which the booth air flows in the horizontal direction; each filter module 54 forms a separating unit, with which the separating device 36 cooperates.

The filter modules 54 are in each case detachably connected as an individual module to the air guiding duct 42 or to an associated air guiding box 48 and, in the case of a limit loading with overspray, can be exchanged for an unladen filter module 54 in each case.

The process air is diverted in each filter module 54 at least twice more by 90° and, after flowing through the filter module 54, passes largely freed from overspray particles into a respective connecting duct 56, via which it then passes into a collecting duct 58.

The process air is passed on, via the collecting duct 58, for further processing and conditioning and following that is led in a circuit (not shown specifically here) into the air supply space 14 again, from which it again flows from above as booth air into the painting tunnel 8.

Instead of the separating device 36 operating with throughflow filters, it is also possible to provide an electrostatically operating separating device, known per se, in which the paint particles are ionised by emission electrodes and deposited on deposition surfaces, which are connected to a high-voltage source for this purpose. Such an electrostatically operating separating device may also complement the filter modules 54, for which purpose, for example, corresponding electrostatically operating separating units may be present in the connecting ducts 56.

Without further measures, during the operation of the painting booth 6, overspray would now be deposited on the surfaces of the air guiding device 34 over which the process air flows on its flow path to the separating device 36. As mentioned at the outset, over time a disruptive layer of overspray which in some cases may have highly adhesive properties would form there.

Figure 2:
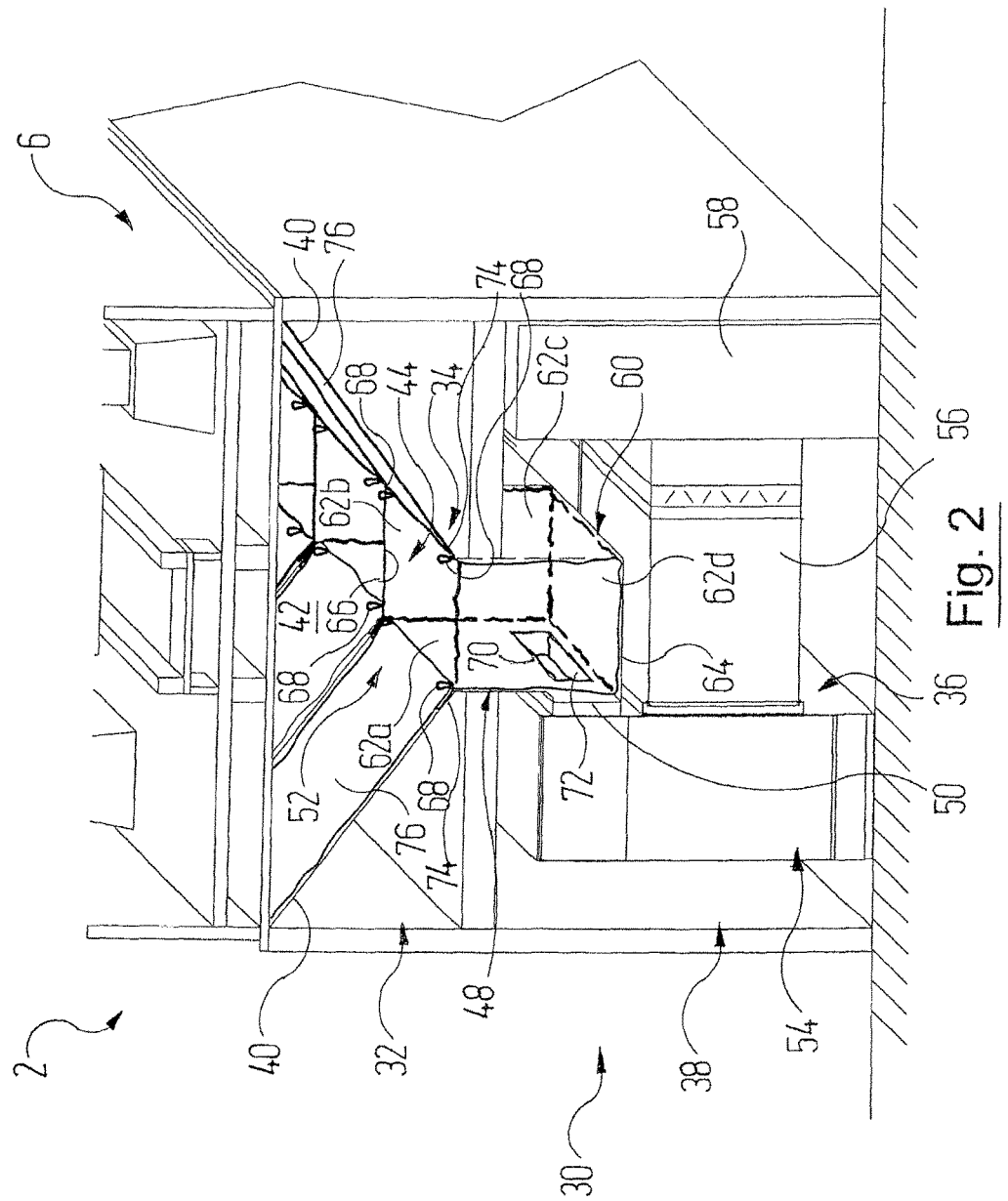
FIG. 2 shows a perspective view of a detail of the painting booth on a larger scale, the air guiding device being shown in a partial phantom view in order to make clear throughflow modules arranged there.
Figure 3:
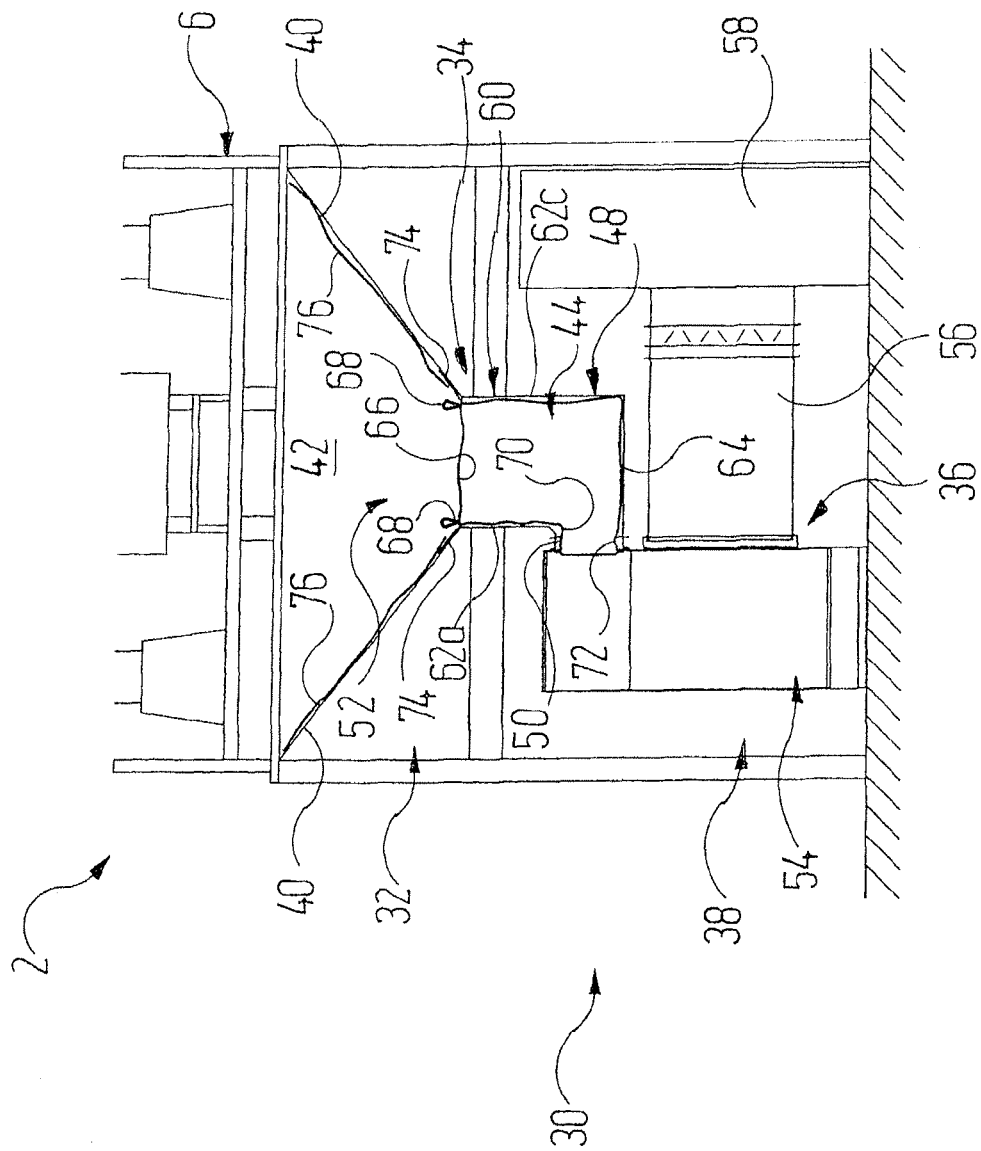
FIG. 3 shows the detail of the painting booth according to FIG. 2 as a vertical section.

In order to protect the affected surfaces therefrom and in order to catch this overspray and be able to pass it on in a simple manner for disposal or processing, exchangeable throughflow modules 60 are inserted in the air guiding boxes 48, which modules can be seen in FIGS. 2 and 3 and of which only one is provided with reference symbols. The air guiding boxes 48 thus form chamber segments of the air guiding device 34, in which throughflow modules 60 can be arranged.

The throughflow modules 60 are produced from a flexible material. Possible materials for this are especially textile materials or plastics, in particular polyethylene or polypropylene, which for their part may be present as a film or woven fabric, as well as woven fabric composite materials. In the exemplary embodiment shown in the present case, the throughflow modules 60 are of sack-like form.

In the direction indications used below, it is assumed that a throughflow module 60 is arranged in its operating position which is shown in FIGS. 2 and 3 and is explained in still further detail below.

The dimensions and the geometry of the throughflow modules 60 are complementary to the dimensions and the geometry of the air guiding boxes 48 with the outlet flange 50. In the present exemplary embodiment, the throughflow modules 60 therefore have four side walls 62a, 62b, 62c and 62d, a bottom 64 and a rectangular upper inlet opening 66 opposite the bottom 64. The cross-section of the throughflow module 60, viewed coaxially to the inlet opening 66, is thus likewise rectangular at least in its clear contour. Transport loops 68 are present in each case at the four corner regions of the inlet opening 66.

The side wall 62a of the throughflow module 60 comprises an outlet opening 70 with a circumferential outlet collar 72 which is formed complementary to the outlet flange 50 of the air guiding box 48 and somewhat longer than the latter in the axial direction. At their upper edges, the side wall 62a with the outlet collar 72 and the opposite side wall 62c of the throughflow module 60 in each case merge into a flap 74 which projects over the side wall 62b and 62d, respectively.

When a throughflow module 60 occupies its operating position, it is inserted in an air guiding box 48 and oriented there such that the inlet opening 66 faces upwards and the outlet collar 72 projects through the outlet flange 50 of the air guiding box 48 into the filter module 54 connected there.

The throughflow module 60 can be anchored to the upper edge of the air guiding box 48, for example, by means of a clamping profile or frame (not shown specifically) which may be intended for a single or a repeated use.

The flaps 74 of the throughflow module 60 in its operating position are turned over onto the air guiding plates 40 which lead to the air guiding box 48. In order to protect these air guiding plates 40 from overspray being deposited and to take up this overspray, covering elements in the form of covers 76 lie on the air guiding plates 40, the covers overlapping and partially covering the flaps 74. These covers 76 can be fastened to the inner edge of the lower opening 20 of the painting tunnel 8, for which purpose, for example, holding lugs may be present there, via which straps on the covers 76 can engage.

In a modification (not shown specifically), the flaps 74 of the throughflow modules 60 can be formed with such a length that they completely cover the air guiding plates 40. In this case, the flaps 74 thus comprise the covers 76.

The painting plant 2 is now operated, with regard to the throughflow modules 60 and the covers 76, as follows:

A throughflow module 60, which is optionally already provided with a clamping profile, is inserted from above into an air guiding box 48 by means of a gripping unit or the like, as known per se. For this purpose, the gripping unit engages on the transport loops 68 of the throughflow module 60, with the result that the latter can be lifted and moved. The access to the desired air guiding box 48 can take place from the painting tunnel 8, for which purpose individual gratings 28 are temporarily removed at the required place on the floor of the painting tunnel 8.

The throughflow module 60 is oriented such that its outlet collar 72 faces in the direction towards the outlet flange 50 of the air guiding box 48, and is then lowered into the air guiding box 48. By means of a tool, for example a long hooked rod, the outlet collar 72 of the throughflow module 60 is unfolded into and through the outlet flange 50 of the air guiding box 48. The flaps 74 are turned over onto the air guiding plates 40; subsequently the covers 76 are laid on the air guiding plates 40. In this way, all the air guiding boxes 60 and all the air guiding plates 40 are provided with throughflow modules 60 and covers 76, respectively.

If the flaps 74 are formed with such a length that they comprise the covers 76, these long flaps 74 are correspondingly unrolled upwards over the air guiding plates 40 by means of a tool.

On its flow path 52 from the painting tunnel 8 to the separating device 36, overspray-laden process air is now therefore led through the exchangeable throughflow modules 60. On the inner surfaces of the latter there is deposited overspray which would otherwise be deposited on the surfaces of the air guiding boxes 48 over which the air flows. In a corresponding manner, is also deposited on the covers 76 which cover the air guiding plates 40.

Over time, there is deposited on the surfaces of the throughflow modules 60 and the covers 76 over which the air flows a layer of overspray which is of such a thickness that proper flowing-off of the process air from the painting booth 8 is no longer ensured. In this case, the throughflow modules 60 and the covers 76 have reached a limit loading with overspray and are exchanged for unladen throughflow modules 60 and covers 76.

For this purpose, the painting operation is stopped. Firstly, the outlet collars 72 of the throughflow modules 60 are pulled inwards into the respective throughflow module 60 with the aid of tools, such as for example long hooked rods or the like. Then the now overspray-laden covers 76 and the flaps 74 or only the correspondingly long flaps 74 are rolled up from the top downwards in the direction of the air guiding boxes 48 and into the overspray-laden throughflow modules 60 likewise with the aid of the tools.

Then the throughflow modules 60 with the turned-in outlet collar 72 and received covers 76 or flaps 74 are lifted upwards out of the associated air guiding box 48 with the aid of the gripping unit already mentioned and subsequently passed on to a disposal and/or recycling process. In principle, the throughflow modules 60 and the covers 76 are to be used as disposable components. Alternatively, a recyclable material may be chosen for the throughflow modules 60 and/or the covers 76.

In the above-described manner, unladen throughflow modules 60 are then inserted into the now empty air guiding boxes 48 again and covers 76 or long flaps 74 are laid on the air guiding plates 40.

Optionally, the exchange of the throughflow modules 60 may also take place in a manual or automated process without having to stop the painting operation for this.

In the exemplary embodiment explained above, the partition walls 46 are provided in the air guiding duct 44 in such a manner that each air guiding box 48 comprises a single outlet flange 50 to a filter module 54. In a modification (not shown specifically), the air guiding boxes 48 and the chamber segments formed thereby may, however, also be larger and then comprise two or even more outlet flanges 50. In this case, a throughflow module 60 adapted to such an air guiding box 48 then also has a plurality of correspondingly arranged and dimensioned outlet collars 72.

Furthermore, throughflow modules 60 with or without covers 76 may also be used in other flow courses of the process air than is the case in the present exemplary embodiment. For example, a tubular throughflow module with an inlet opening and an outlet opening at opposite ends may be designed for a rectilinear flow section on the flow path of the process air. The cross-section and the geometry of the throughflow modules 60, which concrete shape the inlet opening 66 and the outlet opening 70 have and where and in which manner these are arranged depends overall on the structural conditions, i.e. on how the air guiding device 34 defines the region of the flow path 52 into which the throughflow module 60 is inserted. This region is predetermined by the air guiding boxes 48 in the present exemplary embodiment.

Instead of the sack-like form made of a flexible material, a throughflow module 60 may also be produced from a less flexible material. In this case, possible materials for an inflexible throughflow module 60 are especially paper, paperboard and cardboard materials or plastics, and here again polyethylene and polypropylene. For example, box-like throughflow modules 60 or ones shaped as a throughflow tunnel may also be formed here.

In all cases, at least those regions of the throughflow module 60 over which overspray-laden process air flows should be composed of a wet-strength and/or solvent-resistant material, so that no softening or soaking of the throughflow module 60 can occur there when overspray is deposited. In this way, an overspray-laden throughflow module 60 can also be safely grasped and removed without the danger of the material tearing and the air guiding device 34 being contaminated.

Figure 4:
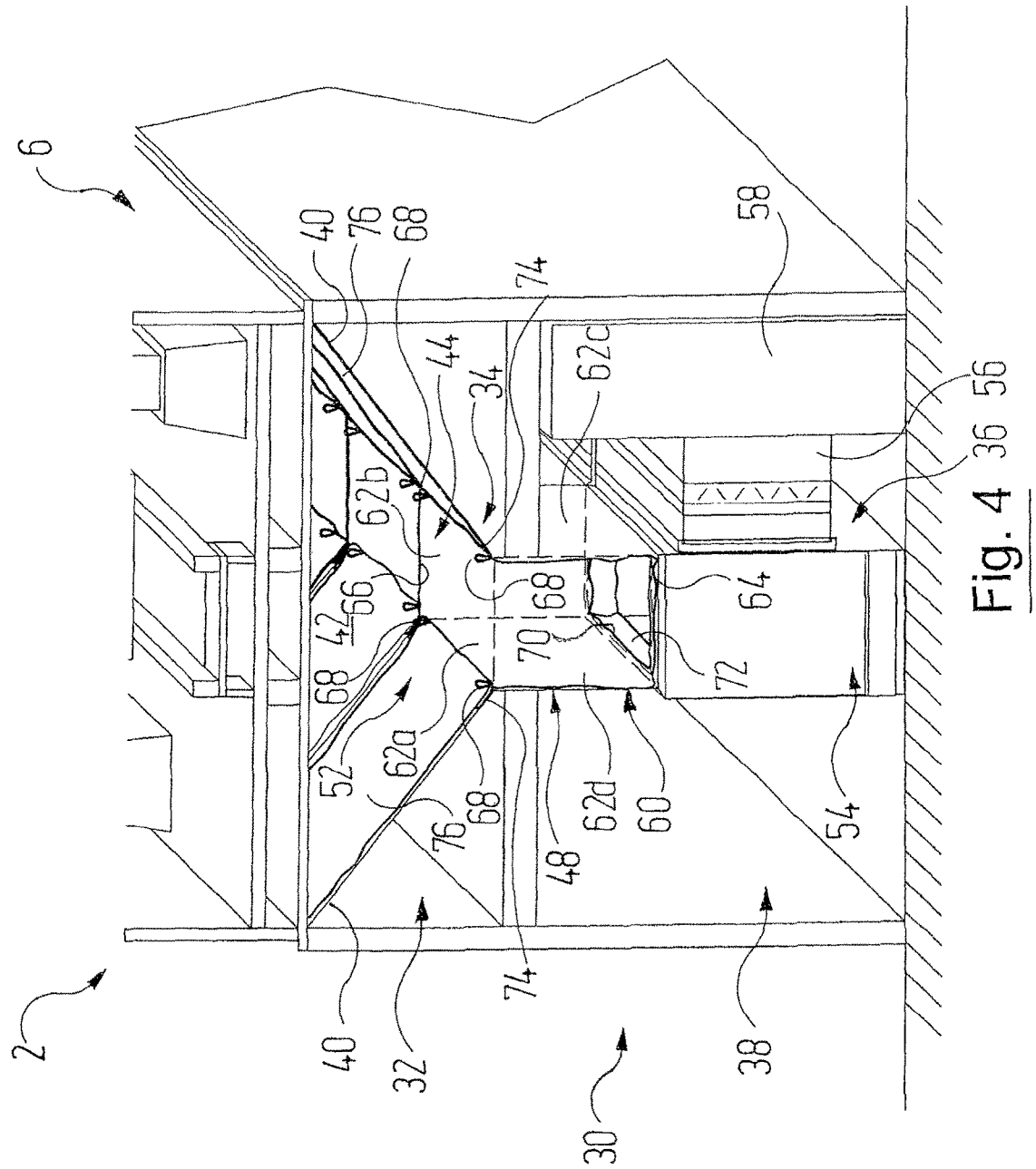
FIG. 4 shows a perspective view, corresponding to FIG. 2, of a second exemplary embodiment with modified air guiding device and throughflow modules adapted thereto.

FIG. 4 shows a second exemplary embodiment of a plant 2, in which the same reference symbols have been allocated as in the plant 2 according to FIGS. 1 to 3. In this figure, the air guiding device 34 is modified and the flow path 52 for the overspray-laden process air leads vertically from the top downwards into the filter module 54. The outlet flange 50 of the air guiding boxes 48 accordingly faces downwards and the filter modules 54 in their operating position are in each case situated beneath an air guiding box 48. The throughflow modules 60 are adapted to this configuration of the air guiding boxes 48, their outlet opening 70 and their outlet collar 72 therefore being correspondingly present in the respective bottom 64 of a throughflow module 60. In this case, the throughflow modules 60 are thus rather of tube-like form.

A throughflow module 60 together with a filter module 54 can then form an exchangeable assembly. For example, a then rather flexible and tubular throughflow module 60 can be placed, initially as a folded-up ring, on the inlet opening of the filter module 54, which opening is then situated vertically at the top. When the filter module 54 has been brought into its operating position, the throughflow module 60 is drawn apart or unfolded in the direction vertically upwards with the aid of a tool. For this purpose, loops 68 may again be present on the throughflow module 60.

When the exchangeable assembly is to be exchanged, firstly the overspray-laden throughflow module 60 is correspondingly folded in downwards towards the filter module 54 and then removed together with the latter.

In a corresponding manner, a throughflow module 60 with a filter module 54 can form such an exchangeable assembly also in the plant 2 according to FIGS. 1 to 3.

In the above-described painting plants 2, the air guiding plates 40 are comparatively highly inclined with respect to a horizontal. In modifications (not shown specifically), however, the air guiding plates 40 may be less highly inclined, so that maintenance personnel can walk on them safely. The exchanging of the throughflow modules 60 and/or the covers 76 can thus be manually assisted by maintenance personnel who are then situated on the air guiding plates 40 during the exchanging operation. A slight inclination of the air guiding plates 40, for example of 3° to 5° with respect to the horizontal, may still be acceptable here.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. Method for carrying off overspray-laden process air of a coating plant, in which method overspray is picked up by an air stream which is led as process air via a flow path to a processing device, comprising:

inserting at least one exchangeable througflow module into a flow path, the at least one exchangeable throughflow module including at inlet opening, an outlet opening, inner surfaces on which overspray can be deposited and at least one flap or cover proximate the inlet opening;

extending the at least one flap or cover outwards from the inlet opening and an interior of the at least one exchangeable throughflow module to cover at least a portion the flow path extending away from the inlet opening;

leading overspray-laden process air through the flow path through the at least one exchangeable throughflow module;

retracting the at least one flap or cover from the flow path and rolling it into the interior of the at least one exchangeable throughflow module through the inlet opening after a limit loading with overspray of the at least one exchangeable throughflow module has been reached; and exchanging the at least one exchangeable throughflow module for an unladen throughflow module after the limit loading with overspray of the at least one exchangeable throughflow module has been reached.

2. The method according to claim 1, wherein an exchanged and overspray-laden throughflow module is passed on to a disposal and/or recycling process.

3. The method according to claim 1, wherein the at least one flap or cover is arranged in a flow duct defining a portion of the flow path using an air guiding device, and the at least one flap or cover at least partially covers the air guiding device when the at least one flap is extended.

4. An apparatus for carrying off overspray-laden process air of a coating plant, in which apparatus overspray is picked up by an air stream which can be led as process air via a flow path to a processing device, comprising:
   a) in the flow path of the overspray-laden process air, at least one exchangeable throughflow module with an inlet opening and an outlet opening can be arranged, on the inner surfaces of which module overspray can be deposited, the at least one exchangeable throughflow module including at least one flap or cover which can be extended outwards from the inlet opening and an interior of the at least exchangeable throughflow module to cover at least a portion of the flow path extending away from the inlet opening and retracted into the interior of the at least one exchangeable throughflow module through the inlet opening after a limit loading of overspray has been reached by the at least one exchangeable throughflow module; and
   b) means for exchanging the at least one throughflow module after the limit loading with overspray has been reached for an unladen throughflow module.

5. The apparatus according to claim 4, wherein at least those regions of the at least one throughflow module over which overspray-laden process air can flow are composed of a wet-strength material.

6. The apparatus according to claim 4, wherein the at least one throughflow module is produced from a flexible material.

7. The apparatus according to claim 6, wherein the at least one throughflow module is produced from a textile material or from a plastic, in particular from polyethylene or polypropylene, or a woven fabric composite material.

8. The apparatus according to claim 4, wherein the at least one throughflow module is produced from an inflexible material.

9. The apparatus according to claim 8, wherein the at least one throughflow module is produced from paper, paperboard or cardboard materials, MDF material, or from wood or from plastics, in particular from polyethylene or polypropylene.

10. The apparatus according to claim 4, wherein an air guiding device is present proximate the inlet opening and which defines the flow path for the overspray-laden process air, and the at least one flap or cover of the at least one throughflow module is formed complementary to that region of the air guiding device so that the at least one flap or cover covers at least a portion of the air guiding device when the at least one flap or cover is extended.

11. The apparatus according to claim 4, wherein an air guiding device is present, which comprises chamber segments in which in each case one throughflow module can be arranged.

12. Plant for coating, in particular for painting objects, comprising:
   a coating booth, in which coating material can be applied to the objects and through which can be led an air stream which picks up resulting overspray and carries it off as process air via a flow path,
   wherein an apparatus for carrying off the process air according to claim 4 is present.

13. The method according to claim 1 further comprising the step of retracting the at least one flap or cover into the at least one exchangeable throughflow module before the at least one exchangeable throughflow module is exchanged for an unladen throughflow module.

14. The method according to claim 1 wherein the at least one exchangeable throughflow module includes a collar proximate the outlet opening, the collar being extended to cover a portion of the flow path proximate the outlet opening.

15. The method according to claim 14 further comprising the step of retracting the collar into the at least one exchangeable throughflow module before the at least one exchangeable throughflow module is exchanged for an unladen throughflow module.

16. The apparatus according to claim 4 wherein the at least one exchangeable throughflow module includes a collar which can be extended and retracted proximate the outlet opening.

17. An apparatus for carrying off overspray-laden process air of a coating plant, in which apparatus overspray is picked up by an air stream which can be led as process air via a flow path to a processing device, comprising:
   a) in the flow path of the overspray-laden process air, at least one exchangeable throughflow module with an inlet opening and an outlet opening can be arranged on the inner surfaces of which module overspray can be deposited, the at least one exchangeable throughflow module including a collar which can be extended and retracted through the outlet opening; and
   b) means are present, by which the at least one throughflow module, after a limit loading with overspray has been reached, is exchangeable for an unladen throughflow module.

* * * * *